United States Patent
Nitanda et al.

(10) Patent No.: US 8,970,397 B2
(45) Date of Patent: Mar. 3, 2015

(54) ROADSIDE DETECTION SYSTEM, DRIVER ASSISTANCE SYSTEM AND ROADSIDE DETECTING METHOD

(75) Inventors: Naoki Nitanda, Anjo (JP); Takayuki Miyahara, Kariya (JP)

(73) Assignee: DENSO CORPORATION, Kariya (JP)

( * ) Notice: Subject to any disclaimer, the term of this patent is extended or adjusted under 35 U.S.C. 154(b) by 650 days.

(21) Appl. No.: 13/176,038

(22) Filed: Jul. 5, 2011

(65) Prior Publication Data

US 2012/0001769 A1 Jan. 5, 2012

(30) Foreign Application Priority Data

Jul. 5, 2010 (JP) ................................ 2010-153105
Apr. 7, 2011 (JP) ................................ 2011-085477

(51) Int. Cl.
*G08G 1/00* (2006.01)
*B60Q 1/00* (2006.01)
*G08G 1/16* (2006.01)
*G08G 1/09* (2006.01)
*G01S 13/00* (2006.01)
(Continued)

(52) U.S. Cl.
CPC .............. *G01S 17/936* (2013.01); *G01S 17/42* (2013.01); *G06K 9/00798* (2013.01)
USPC ........... 340/901; 340/435; 340/903; 340/905; 342/70; 342/109

(58) Field of Classification Search
CPC .......... G01S 17/42; G01S 17/936; G08G 1/16
USPC .................... 340/435, 903, 905; 356/141.1
See application file for complete search history.

(56) References Cited

U.S. PATENT DOCUMENTS 5,555,312 A * 9/1996 Shima et al. ................ 382/104
5,929,784 A * 7/1999 Kawaziri et al. ............. 340/903

(Continued)

FOREIGN PATENT DOCUMENTS

JP 2000-331148 A 11/2000
JP 2000331148 A * 11/2000

(Continued)

OTHER PUBLICATIONS

Office Action mailed Mar. 12, 2013 in corresponding JP patent application No. 2011-085477 (and English translation).

(Continued)

*Primary Examiner* — Daniell L Negron
*Assistant Examiner* — Mohamed Barakat
(74) *Attorney, Agent, or Firm* — Posz Law Group, PLC

(57) ABSTRACT

A roadside detection system installed in a vehicle to detect a roadside of a road on which the vehicle travels includes detection results acquiring means, first edge line detecting means and second edge line detecting means. The detection results acquiring means emits light waves or electromagnetic waves to a target detection region in which an object to be measured is detected and acquires an objective distance and a reflection intensity, for each of separate regions obtained by separating the target detection region into a plurality of divisions. The first edge line detecting means detects a first edge line that is a candidate of a roadside based on each objective distance. The second edge line detecting means detects a second edge line that is a candidate of a roadside based on each reflection intensity. A driver assistance system and a roadside detecting method are also provided.

19 Claims, 11 Drawing Sheets

(51) Int. Cl.
*G01S 13/58* (2006.01)
*G01S 17/93* (2006.01)
*G01S 17/42* (2006.01)
*G06K 9/00* (2006.01)

(56) References Cited

U.S. PATENT DOCUMENTS

| | | | |
|---|---|---|---|
| 6,239,741 B1 * | 5/2001 | Fontana et al. | 342/135 |
| 6,317,202 B1 * | 11/2001 | Hosokawa et al. | 356/141.1 |
| 6,665,056 B2 * | 12/2003 | Shirai et al. | 356/5.05 |
| 7,218,207 B2 * | 5/2007 | Iwano | 340/435 |
| 7,275,431 B2 * | 10/2007 | Zimmermann et al. | 73/510 |
| 7,289,059 B2 * | 10/2007 | Maass | 342/70 |
| 7,359,782 B2 * | 4/2008 | Breed | 701/45 |
| 7,411,486 B2 * | 8/2008 | Gern et al. | 340/438 |
| 7,504,989 B2 * | 3/2009 | Tsuchihashi et al. | 342/91 |
| 7,650,239 B2 * | 1/2010 | Samukawa et al. | 701/300 |
| 7,791,527 B2 * | 9/2010 | Haag et al. | 342/70 |
| 8,265,834 B2 * | 9/2012 | Inoue et al. | 701/49 |
| 8,284,383 B2 * | 10/2012 | Beppu et al. | 356/4.07 |
| 2008/0040039 A1 * | 2/2008 | Takagi | 701/300 |
| 2010/0017060 A1 | 1/2010 | Zhang et al. | |
| 2010/0034426 A1 * | 2/2010 | Takiguchi et al. | 382/106 |
| 2013/0010074 A1 | 1/2013 | Takiguchi et al. | |
| 2013/0011013 A1 | 1/2013 | Takiguchi et al. | |

FOREIGN PATENT DOCUMENTS

| | | |
|---|---|---|
| JP | A-2005-010892 | 1/2005 |
| JP | A-2008-014814 | 1/2008 |
| JP | 2009-140175 A | 6/2009 |
| JP | 2009-204615 A | 9/2009 |

OTHER PUBLICATIONS

H. Cramer et al., "Road border detection and tracking in non cooperative areas with a laser radar system," Proceeding GRS 2002 German Radar Symposium, Bonn, 3.-5, pp. 1-5 (Sep. 2002).

* cited by examiner

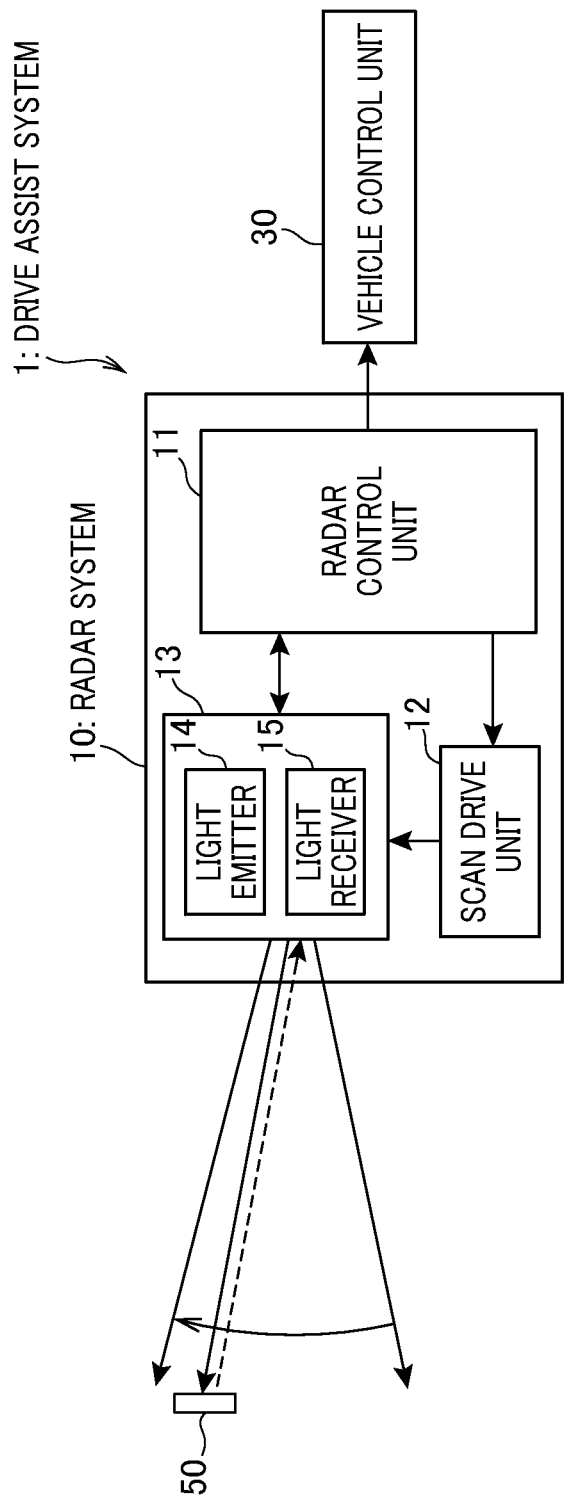

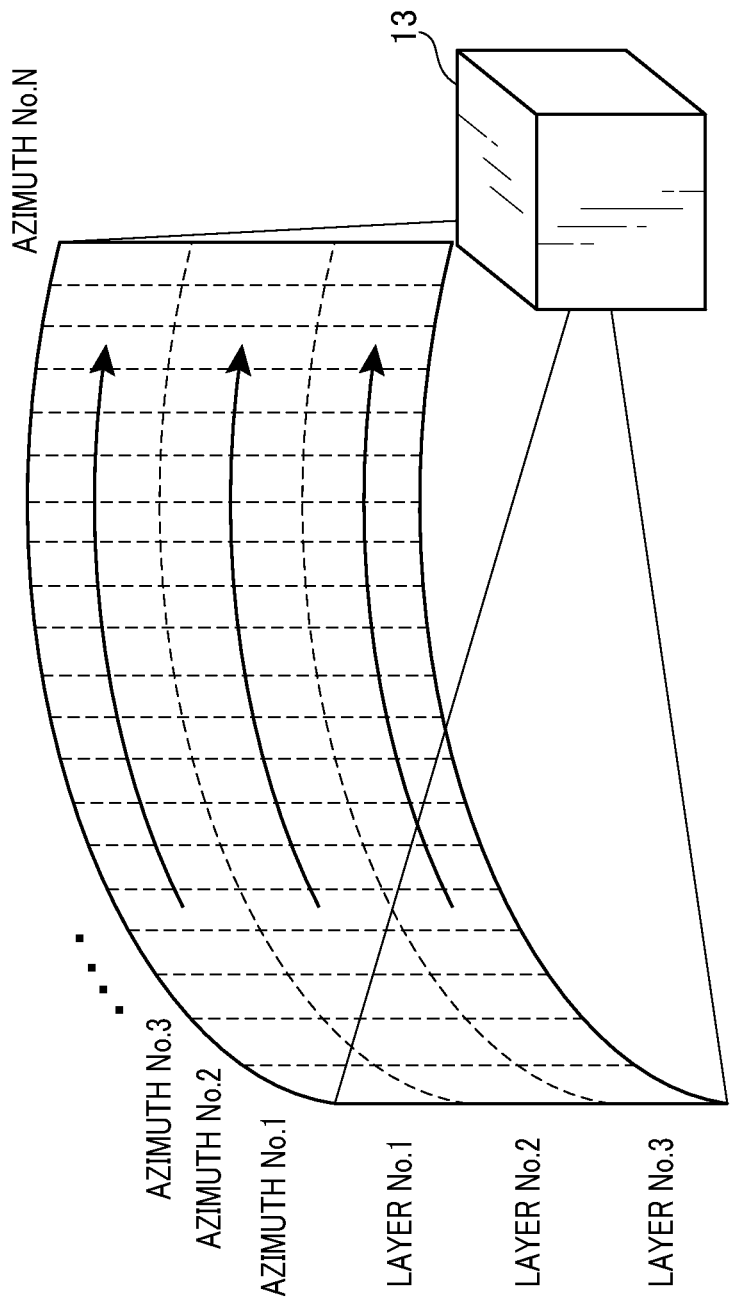

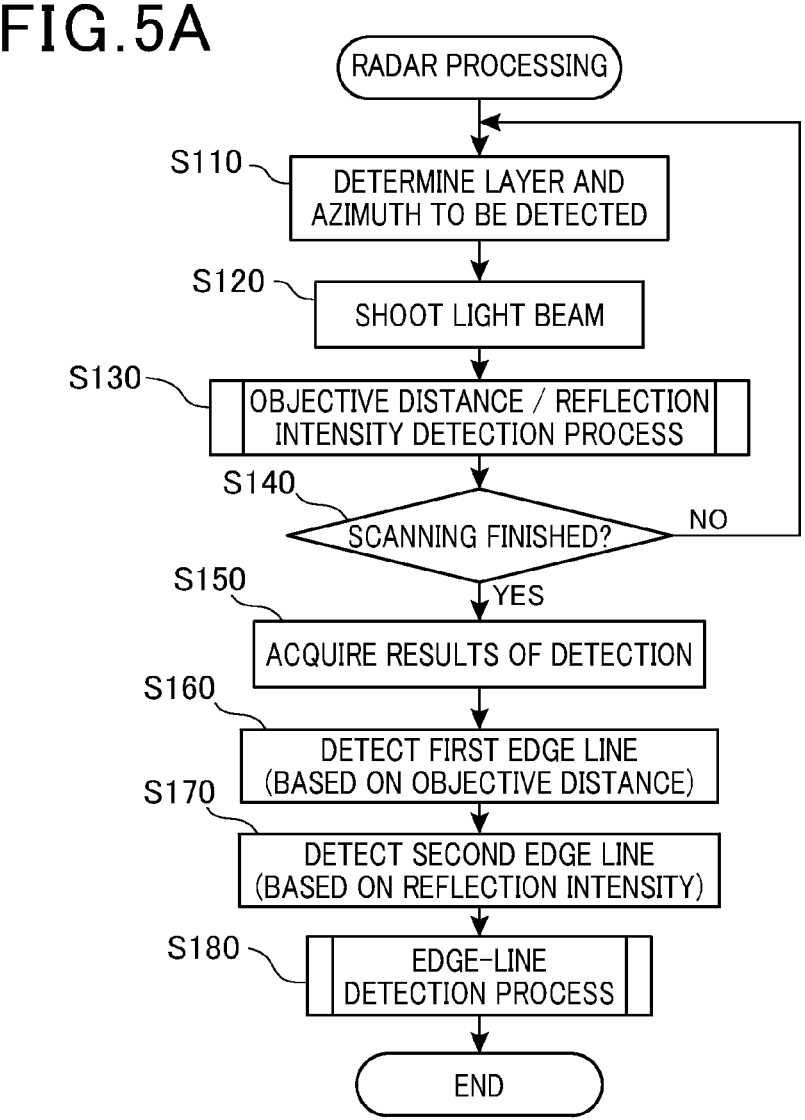
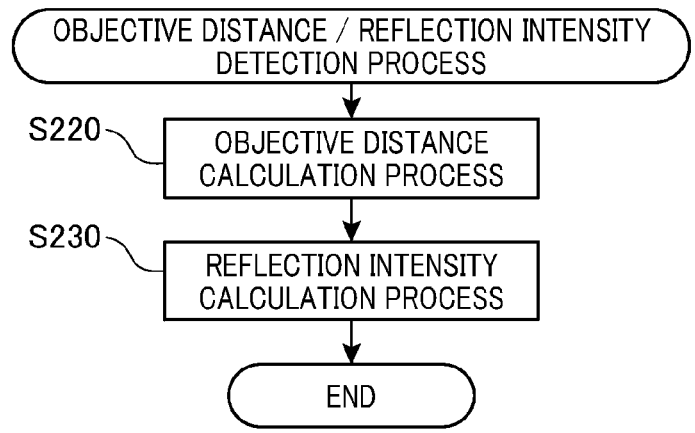

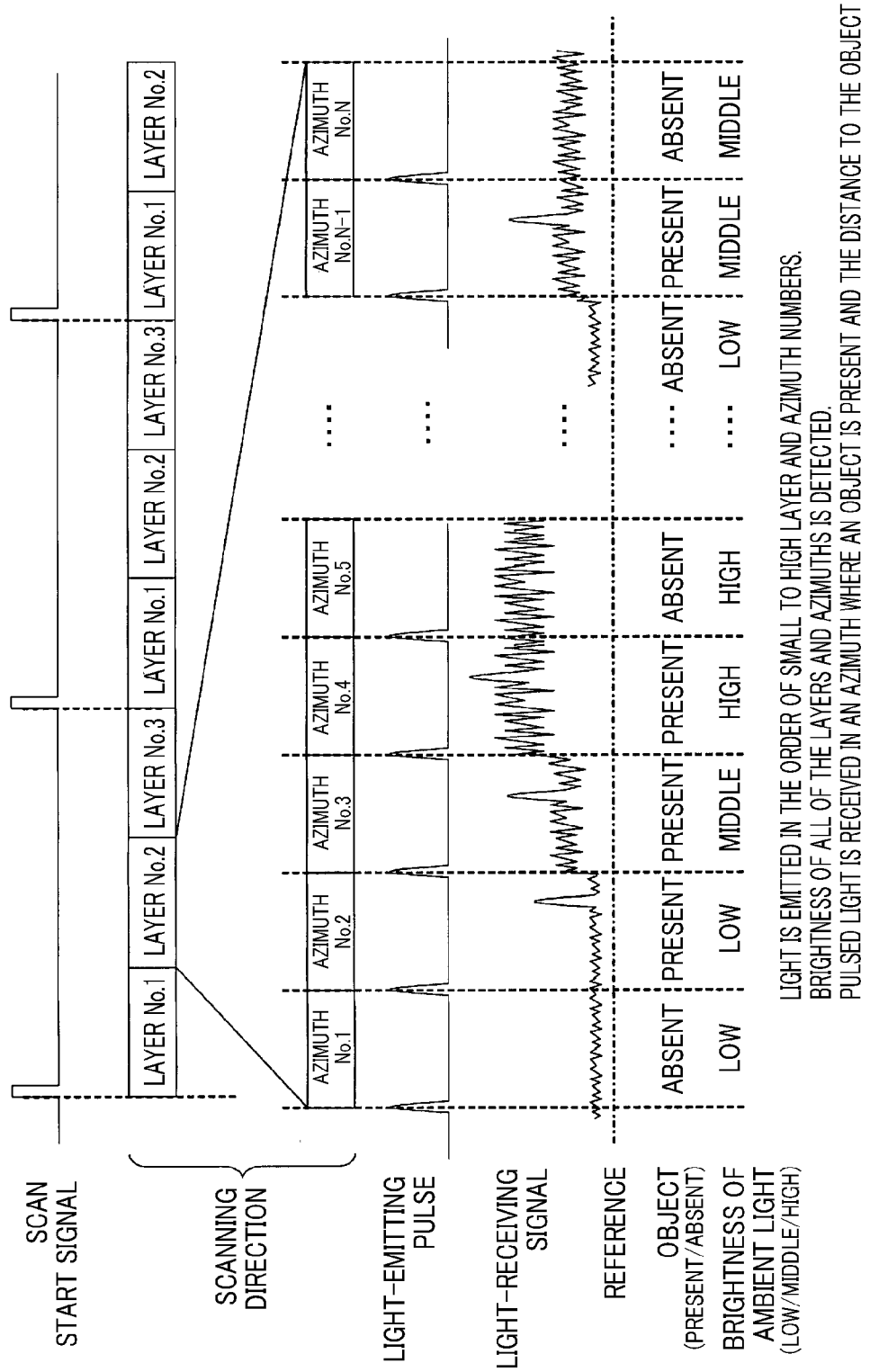

»
FIG. 8A
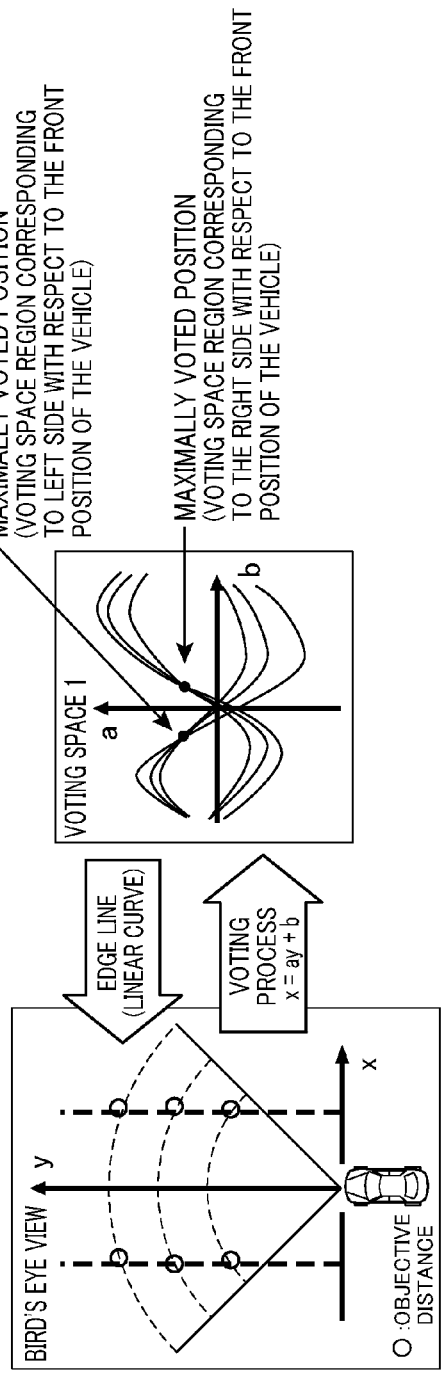
FIG. 8B
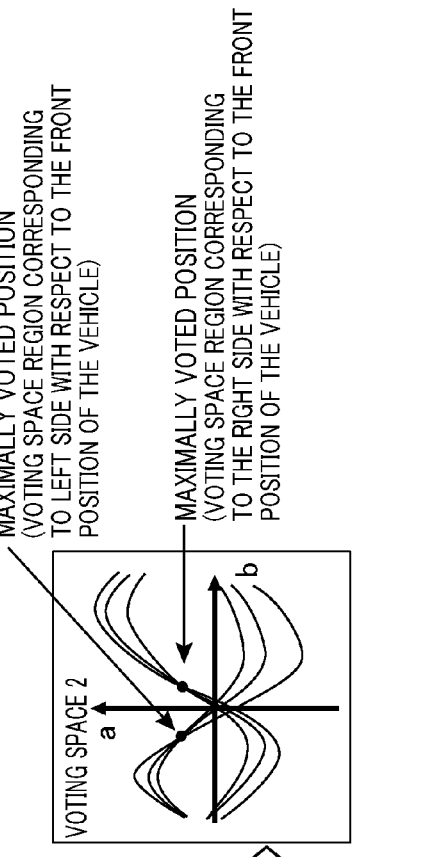
FIG. 8C
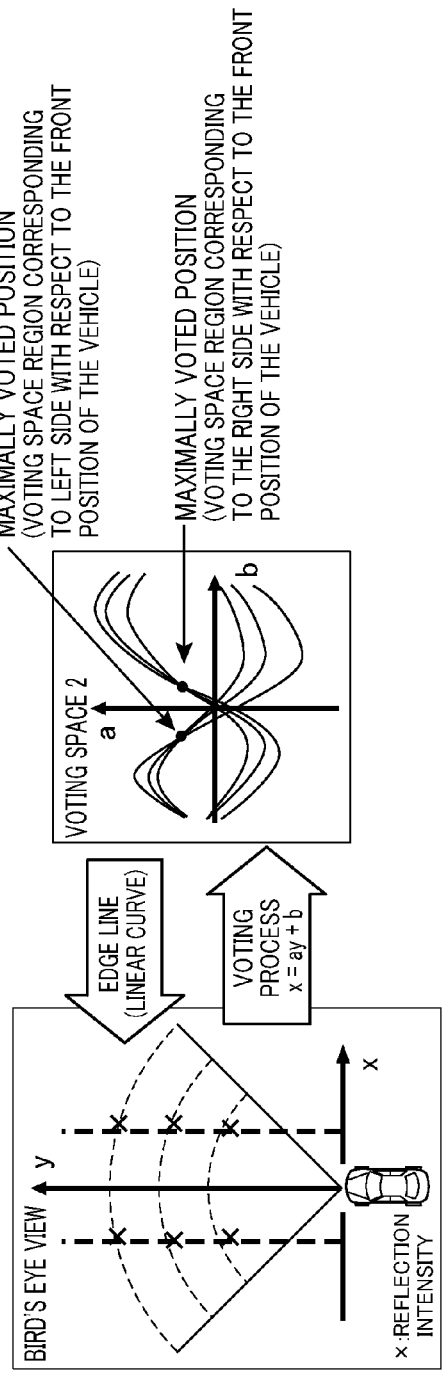
FIG. 8D

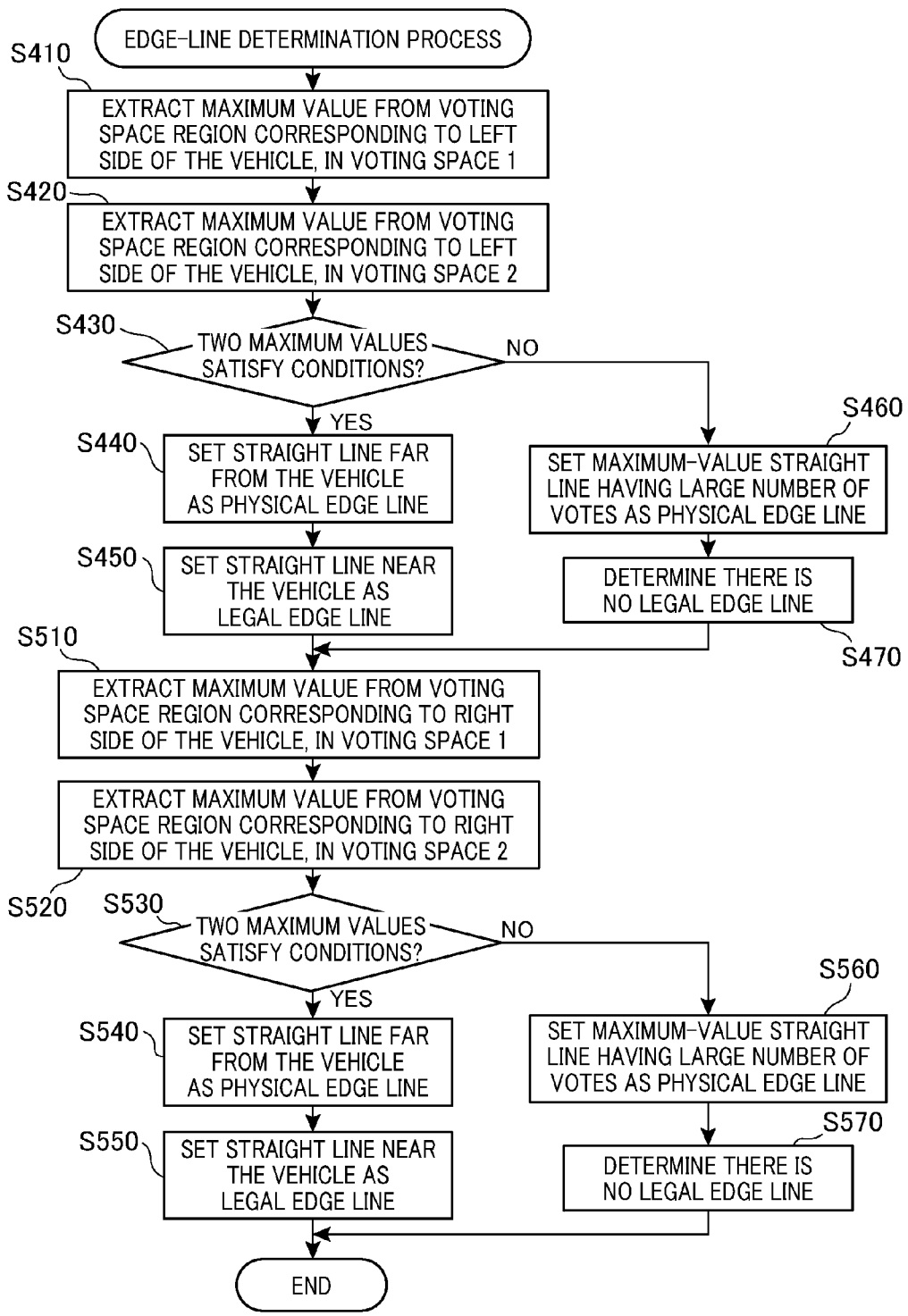

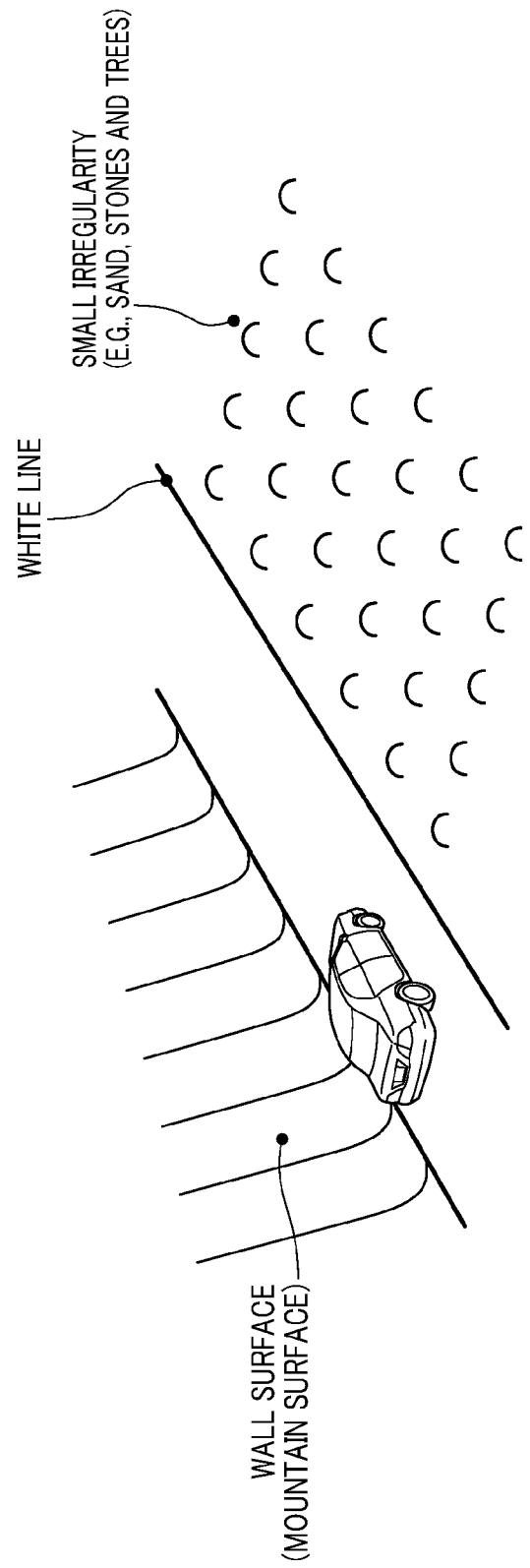

ROADSIDE DETECTION SYSTEM, DRIVER ASSISTANCE SYSTEM AND ROADSIDE DETECTING METHOD

CROSS-REFERENCE TO RELATED APPLICATION

This application is based on and claims the benefit of priorities from earlier Japanese Patent Application Nos. 2010-153105 and 2011-085477 filed Jul. 5, 2010 and Apr. 7, 2011, respectively, the descriptions of which are incorporated herein by reference.

BACKGROUND OF THE INVENTION

1. Technical Field of the Invention

The present invention relates to a roadside detection system that detects a location of an end portion of a road on which the vehicle travels, and to a driver assistance system and a roadside detecting method.

2. Related Art

As a technique for detecting a roadside, it is known that a laser beam is emitted to scan a range, detect a distance (objective distance) to a target and estimate a region where the objective distance drastically changes (i.e. a region where there is irregularity) as a roadside. For example, JP-B-4100269 discloses such a technique.

However, if there is no irregularity on a roadside, a region where an objective distance drastically changes cannot be detected with the technique mentioned above. Therefore, a roadside may not be detected using this technique. For example, the technique mentioned above is able to detect a roadside having irregularity, such as a wall surface (e.g., mountain surface) or a cliff as shown in FIG. 1A, or a guard rail or a curb as shown in FIG. 1B. However, the technique is not able to detect white lines or other road marks that define areas having no irregularity, such as a road shoulder and a lane dedicated to two-wheeled vehicles, as shown in FIG. 2.

SUMMARY

In light of the conditions as set forth above, it is desired to provide a roadside detection system for detecting the location of an end portion of a road on which the vehicle travels, which is able to detect a roadside with high accuracy.

In order to achieve the object set forth above, in a first exemplary embodiment, a roadside detection system installed in a vehicle to detect either a left or right end portion (hereinafter referred to as "roadside") of a road on which the vehicle travels includes: detection results acquiring means that emits light waves or electromagnetic waves to a target detection region in which an object to be measured is detected and acquires a distance to the object to be measured (hereinafter referred to as "objective distance") and an intensity of a reflected wave reflected from the object to be measured (hereinafter referred to "reflection intensity"), for each of separate regions obtained by separating the target detection region into a plurality of divisions; first edge line detecting means that detects a first edge line that is a candidate of a roadside based on each objective distance; and second edge line detecting means that detects a second edge line that is a candidate of a roadside based on each reflection intensity.

According to the roadside detection system, both of objective distance and reflection intensity are used for the detection of a roadside. Accordingly, if at least one of the boundaries is detected, a roadside is detected. Thus, the accuracy of detecting a roadside is enhanced.

The first edge line detecting means is able to detect irregularity on the surface of a road based on the difference between objective distances (time lag from when a laser beam is emitted until when the reflected light is received). The second edge line detecting means is able to detect an edge line from which the material (reflectance) changes in the road, based on the difference between reflection intensities. In detecting a roadside, the roadside may be set based on at least either of the first and second boundaries. For example, it may be so configured that the first or second edge line may be set as a roadside, or a roadside may be set between the first and second roadsides.

In the roadside detection system having a second configuration, the first edge line detecting means detects a portion defined by the first edge line, in which a difference between the objective distances of adjacent separate regions among the individual separate regions becomes equal to or more than a reference distance difference; and the second edge line detecting means detects a portion defined by the second edge line, in which a difference between the reflection intensities of adjacent separate regions among the individual separate regions becomes equal to or more than a reference intensity difference.

According to the roadside detection system, the boundaries at which the difference in objective distance and a difference in reflection intensity are equal to or more than the respective references may be set as a first edge line and a second edge line, respectively.

In the roadside detection system having a third configuration, the detection results acquiring means acquires objective distance and reflection intensity of each separate region detected by optical detecting means that emits a light wave to each of the separate regions to receive reflected light that is a reflection of the light wave from an object to be measured, in a target detection region formed by virtually juxtaposing a number of separate regions in a crosswise direction perpendicular to a traveling direction of the vehicle, each of the separate regions serving as a target in which an object to be measured is detected.

According to the roadside detection system, a region to be detected is formed by virtually juxtaposing a number of separate regions in the crosswise direction of the vehicle, which is perpendicular to the traveling direction of the vehicle. Thus, each of the boundaries is more accurately detected.

In the roadside detection system having a fourth configuration, the system is provided with the optical detecting means. The roadside detection system can function as a radar system provided with an optical detecting means.

In the roadside detection system having a fifth configuration, the detection results acquiring means acquires a plurality of sets of objective distance and reflection intensity detected in the plurality of respective separate regions; and each edge line detecting means detects each edge line using the plurality of objective distances and reflection intensities detected in the plurality of respective separate regions.

According to the roadside detection system, a roadside is detected using a plurality of sets of reflection intensity and objective distance detected in the plurality of respective separate regions. Accordingly, comparing with the case where a single set of reflection intensity and objective distance is used, the system is unlikely to be adversely affected such by noise or the like. Thus, the accuracy of detecting a roadside is more enhanced.

In the roadside detection system having a sixth configuration, the system is provided with roadside setting means that sets, as a roadside, location of the first edge line or location of the second edge line.

According to the roadside detection system, the first or second edge line is set as a roadside. In the roadside detection having a seventh configuration, the roadside setting means detects a roadside on the left and on the right with reference to a front position of the vehicle in the crosswise direction.

According to the roadside detection system, a roadside is detected not only on either of the left and right side but also on both of the left and right sides. In the roadside detection system having an eighth configuration, the roadside setting means sets, as a roadside, either of the edge lines detected by the edge line detecting means, whichever is nearer to the front position of the vehicle.

According to the roadside detection system, a roadside is judged to be the edge line nearer to the front position of the vehicle. Accordingly, if a roadside is erroneously detected, it is ensured that the erroneous detection will not cause running off, or the like, of the vehicle.

In the roadside detection system having a ninth configuration, the roadside setting means sets the first edge line as a physical edge line that serves as a roadside and sets the second edge line as a legal edge line that serves as a roadside when the locations of the edge lines detected by the edge line detecting means are different from each other.

The term "physical edge line" here refers to an edge line which, if it is crossed over, may lead to collision or running off the road. The term "legal edge line" refers to an edge line which, if it is crossed over, may not immediately lead to collision or running off but may lead to traveling out of the region which is accepted as a road.

According to the roadside detection system, a physical edge line is distinguished from a legal edge line.

In order to achieve the above object, a driver assistance system having a tenth exemplary embodiment includes: roadside detecting means that detects an end portion (hereinafter referred to as "roadside") of a road on which the vehicle travels; drive assisting means that gives drive assist so that the vehicle no longer comes close to a roadside when the vehicle nears the roadside, wherein: the roadside detecting means is configured as the roadside detection system recited in any one of the foregoing configurations.

According to the roadside detection system, drive assist is given according to the results of the detection of a roadside so that the vehicle would not deviate from the road.

In the driver assistance system having an eleventh configuration, the roadside detecting means is configured as the roadside detection system recited in the ninth configuration; and the drive assisting means gives drive assist differently between when the vehicle nears a physical line and when the vehicle nears a legal line.

According to the driver assistance system, if both of a physical edge line and a legal edge line are detected, different drive assist may be given depending on which of the boundaries the vehicle has neared.

In order to achieve the above object, a roadside detecting method includes: a detection results acquiring step of emitting light waves or electromagnetic waves to a target detection region in which an object to be measured is detected and acquiring a distance to the object to be measured (hereinafter referred to as "objective distance") and an intensity of a reflected wave reflected from the object to be measured (hereinafter referred to "reflection intensity"), for each of separate regions obtained by separating the target detection region into a plurality of divisions; a first edge line detecting step of detecting a first edge line that is a candidate of a roadside based on each objective distance; and a second edge line detecting step of detecting a second edge line that is a candidate of a roadside based on each reflection intensity.

According to the roadside detection method, at least the effects that can be obtained from the roadside detection system described above may be enjoyed.

BRIEF DESCRIPTION OF THE DRAWINGS

In the accompanying drawings:

FIG. 3 is a schematic explanatory diagram illustrating a configuration of a drive assist system;

FIG. 4 is a schematic diagram illustrating a region where laser beams are emitted, according to an embodiment of the present invention;

FIG. 5A is a flow diagram illustrating radar processing performed in the system;

FIG. 5B is a flow diagram illustrating an objective distance/reflection intensity detection process performed in the system;

FIG. 6 is a graph illustrating detection level of a light receiver relative to time, according to the embodiment;

FIGS. 8A to 8D are schematic diagrams illustrating a voting process performed in the system;

FIG. 9 is a flow diagram illustrating an edge-line determination process performed in the flow shown in FIG. 5;

FIG. 11 is a bird's eye view illustrating advantages of using both of objective distance and reflection intensity.

DETAILED DESCRIPTION OF THE PREFERRED EMBODIMENTS

Figure 1A:
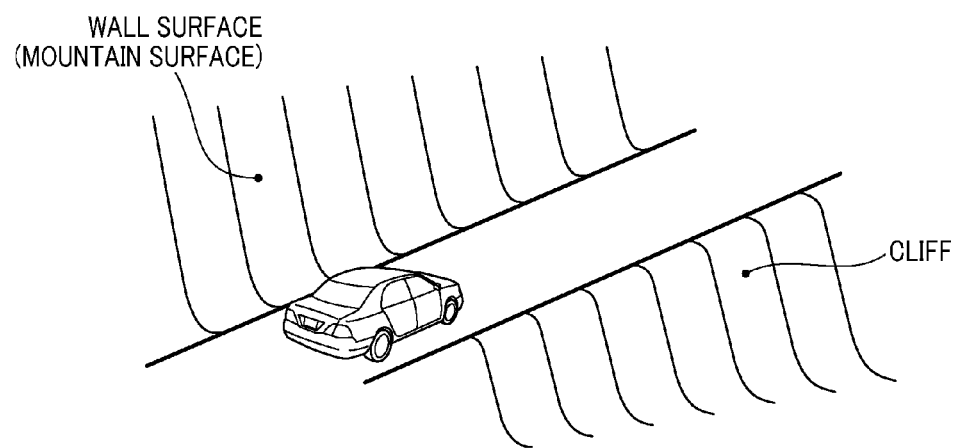
FIGS. 1A and 1B are bird's eye views illustrating examples of roadsides that can be detected using conventional art.
Figure 1B:
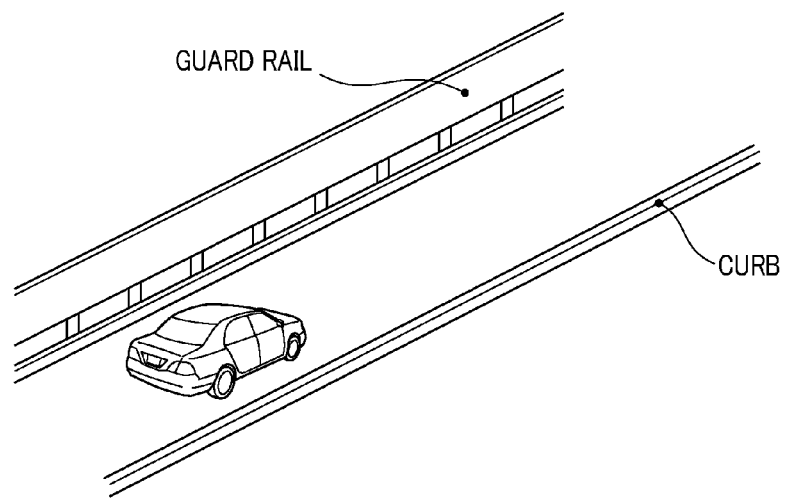

With reference to the accompanying drawings shown in FIGS. 3-11, hereinafter will be described an embodiment of the present invention.

FIG. 3 is a schematic explanatory diagram illustrating a configuration of a drive assist system 1 (driver assistance system) according to an embodiment of the present invention. FIG. 4 is a schematic diagram illustrating a region where laser beams are emitted. The drive assist system 1 is installed in a vehicle, such as an automobile. As shown in FIG. 3, the drive assist system 1 is provided with a radar system 10 (roadside detection system, optical detecting means) and a vehicle control unit 30.

The radar system 10 includes a radar control unit 11, a scan drive unit 12 and an optical unit 13.

The radar control unit 11 is configured as a known microcomputer including CPU, ROM and RAM. The radar control unit 11 handles various tasks including radar processing described later in accordance with a program stored such as in the ROM. The radar control unit 11 may be configured by hardware in the form such as of a circuit. Also, the radar control unit 11 carries out the radar processing described later to measure an objective distance that is a distance from the vehicle to an object to be detected (object 50), and a reflection intensity. At the same time, the radar control unit 11 detects an edge line (defining roadside) in a crosswise direction of the road where the vehicle travels, by carrying out the radar processing described later.

The scan drive unit 12 is configured as an actuator, such as a motor. The scan drive unit 12 is configured to orient the optical unit 13 to any position in a horizontal direction and a vertical direction, upon reception of a command from the radar control unit 11. Every time a scan start signal is received from the radar control unit 11, the scan drive unit 12 drives the optical unit 13 so that one-cycle scan can be performed (see FIG. 6).

The optical unit 13 includes a light emitter 14 and a light receiver 15. The light emitter emits a laser beam in accordance with a command from the radar control unit 11. The light receiver 15 receives a reflected wave (indicated by the broken-line arrow in FIG. 3) which is a reflection from the objet 50 of the laser beam (indicated by the solid-line arrow in FIG. 3) emitted from the light emitter 14.

The scan drive unit 12 may only have to be configured such that the direction in which a laser beam is emitted by the light emitter 14 resultantly coincides with the direction in which the reflected light is receivable by the light receiver 15. For example, it may be so configured that, the scan drive unit 12 drives a mirror, instead of the optical unit 13, in such a way that a laser beam and reflected light are reflected in any direction.

In this configuration, a mirror having a plurality of reflecting surfaces may be used. The mirror may be rotated by the scan drive unit 12 to scan a laser beam in a horizontal direction. In this case, allowing each reflecting surface to have a different angle, a laser beam may also be directed to the vertical direction to perform scanning. An alternative configuration may be provided, in which a mirror having a single reflecting surface is ensured to be directed to any required direction.

Alternatively, the scan drive unit 12 may be configured to change the direction of only the light receiver 15. In this case, the light emitter 14 does not change its own direction but may be configured such that a laser beam can be emitted over a partial or entire region in which the light-receiving direction of the light receiver 15 is scanned. For example, the light receiver 15 may be configured such as with a MEMS (micro-electro-mechanical system) for the change of the direction thereof to thereby reduce the size of the radar system 10.

As described above, the radar system 10 may be configured as a LIDAR (light detection and ranging) system. In the radar system, laser beams, which are electromagnetic waves, are intermittently emitted in any direction (traveling direction that is the direction in which the vehicle travels in the present embodiment) of the vehicle over a predetermined range to scan the range, and then the respective reflected waves (reflected light) are received to detect a target in the forward direction of the vehicle, as a group of detection points.

In the radar system 10 of the present embodiment, the radar control unit 11 uses the scan drive unit 12 as described above to allow the laser beams emitted from the optical unit 13 to scan within a predetermined region. Specifically, as shown in FIG. 4, laser beams are intermittently emitted in the horizontally rightward direction from the upper-left corner to the upper-right corner of this region at regular intervals (in an equiangular manner), while the range of emitting the laser beams is changed. When a laser beam has reached the upper-right corner, laser beams are again emitted in the horizontally rightward direction from a region lower than the upper-left corner by a predetermined angle, while the range of emitting the laser beams is changed.

Repeating this operation, the radar system 10 sequentially emits laser beams over the entire predetermined region. The radar system 10 detects the location of a target (detection point) every time a laser beam is emitted, based on the timing the reflected wave has been detected and the direction in which the laser beam has been emitted.

It should be appreciated that the entire region over which laser beams are emitted is divided into matrix blocks (separate regions) with a number being allocated to each of the blocks. Thus, the direction in which the radar system 10 is oriented is ensured to be specified. For example, as shown in FIG. 4, regarding the horizontal direction, a number is sequentially allocated from the left to right, which number is referred to as "azimuth number". Regarding the vertical direction, a number is sequentially allocated from the top to bottom, which number is referred to as "layer number".

The vehicle control unit 30 is configured as a known microcomputer including CPU, ROM and RAM. The vehicle control unit 30 carries out various tasks including controlling the behaviors of the vehicle and giving warning to the driver in accordance with a program stored such as in a ROM. For example, the vehicle control unit 30 may receive a command from the radar system 10 to conduct drive assist by which a behavior of the vehicle is changed (or the change of the behavior is urged). In this case, the vehicle control unit 30 may output a control signal corresponding to the command to any one of a display device, audio output device, braking device, steering gear, and the like, which are not shown.

The vehicle control unit 30 carries out a vehicle control process described later to raise an alarm or apply a brake if the vehicle is on the verge of deviating from the road.

Figure 7:
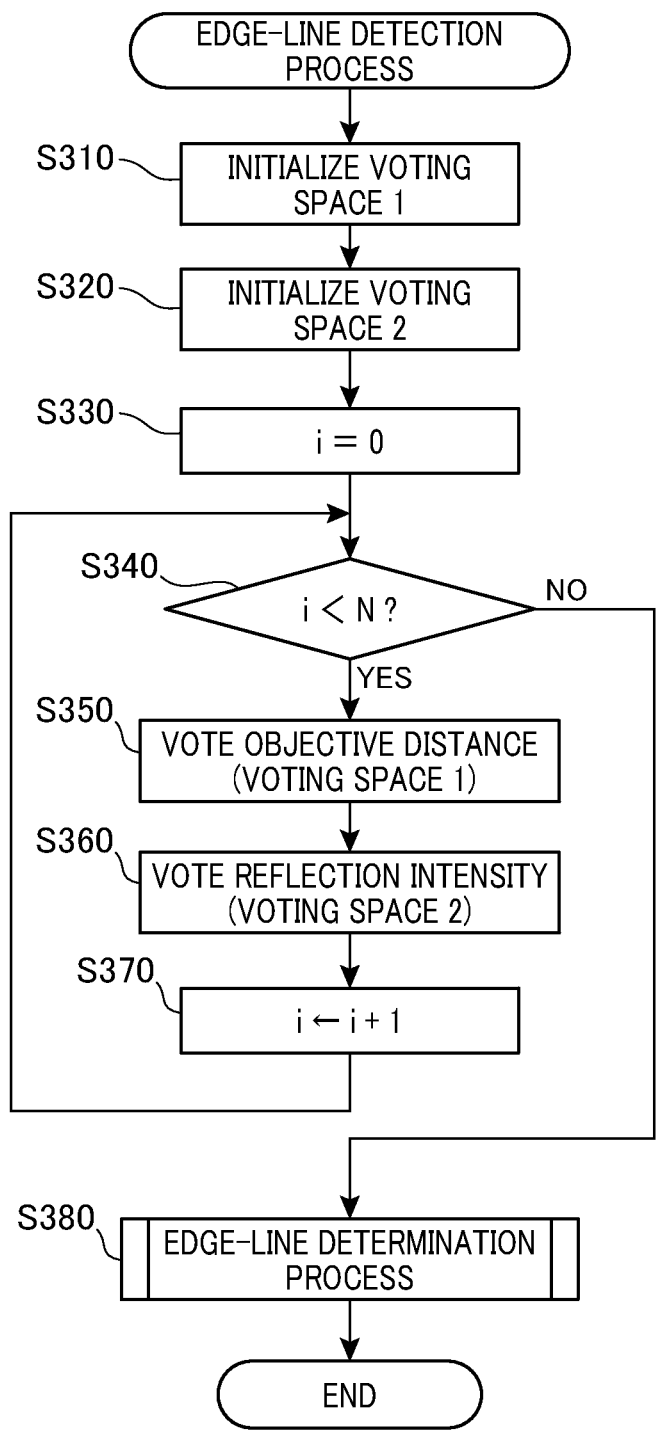
FIG. 7 is a flow diagram illustrating an edge-line detection process performed in the system.

For example, the drive assist system 1 carries out processes as set forth below. FIG. 5A is a flow diagram illustrating radar processing (roadside detecting means) carried out by the radar control unit 11 of the radar system 10. FIG. 5B is a flow diagram illustrating an objective distance/reflection intensity detection process in the radar processing. FIG. 7 is a flow diagram illustrating an edge-line detection process of the radar processing. FIG. 9 is a flow diagram illustrating an edge-line determination process of the radar processing.

The radar processing is started, for example, when power of the radar system 10 is turned on. Once power is turned on, the radar processing is performed at a predetermined cycle (e.g., every 100 ms). Specifically, as shown in FIG. 5A, a direction (azimuth number and layer number) in which an objective distance and a reflection intensity are to be detected is set (S110). When the direction of emitting the laser beams coincides with the set direction, a laser beam is emitted from the light emitter 14 (S120).

Then, the objective distance/reflection intensity detection process (S130) is carried out. As shown in FIG. 5B, in the objective distance/reflection intensity detection process, an objective distance calculation process (S220) and a reflection intensity calculation process (S230) are sequentially carried out. In the objective distance calculation process, the distance to an object from which the laser beam is reflected is calculated with the timing when the reflected light is received. In the reflection intensity calculation process, a received light intensity (reflection intensity) of the reflected light is detected. When these processes are ended, the objective distance/reflection intensity process is ended.

Referring now to FIG. 6, hereinafter is described a mechanism of detecting an objective distance and a reflection intensity based on the reflected light detected by the light receiver 15, such as in the distance calculation process and the reflection intensity calculation process. FIG. 6 is a graph illustrating detection level of the light receiver 15 relative to time.

The example shown in FIG. 6 indicates output from the light receiver 15 in layer No. 2 in the case where a maximum value of layer number is "3" and a maximum value of azimuth number is "N". In FIG. 6, the horizontal axis indicates a time base, with a scan start signal being indicated at the top stage. The scan start signal is a pulse signal generated at a predetermined cycle (e.g., every 100 ms). The scan start signal coincides with the timing when scanning from layer Nos. 1 to 3 is finished and again returns to layer No. 1.

The second stage in FIG. 6 indicates transition of the layers to be scanned. As indicated at the second stage of FIG. 6, it is so configured that scanning is sequentially performed over layer Nos. 1 to 3 and again returns to layer No. 1, thereby repeating light emission and light reception.

From the third stage onward of FIG. 6, the process in layer No. 2 is indicated, being enlarged. It should be appreciated that the processing of from the third stage onward of FIG. 6 is performed not only in layer No. 2 but also in layer Nos. 1 and 3.

The third stage of FIG. 6 indicates transition of azimuth in which scanning is conducted. As indicated at the third stage of FIG. 6, it is ensured that scanning is sequentially conducted in each layer from azimuth Nos. 1 to N and that the scanning is shifted to azimuth No. 1 in the subsequent layer.

The fourth stage of FIG. 6 indicates a time position of a light-emitting pulse in each azimuth. As indicated at the fourth stage of FIG. 6, it is ensured that a pulse is generated coinciding with the start time of scanning in each azimuth.

The fifth and sixth stages of FIG. 6 indicate a light-receiving signal and the results of a determination regarding the presence/absence of an object based on the light-receiving signal. As described above, the radar system 10 calculates a distance to an object to which a laser beam has been emitted. The calculation is performed with the timing when the reflected light is received.

In fact, however, the light receiver 15 not only senses the laser beam emitted from the light emitter 14 but also senses the light (ambient light) around the radar system 10. Accordingly, it is required to provide a process in which the laser beam emitted from the light emitter 14 is detected from among the received light. Here, if there is a light-receiving signal having a larger reflection intensity than the ambient light, it is determined that an object is present. For example, in azimuth No. 1 at the fifth and sixth stages of FIG. 6, no prominent light-receiving signal is found with respect to an average brightness of the ambient light in the azimuth. Accordingly, it is determined that no object is present.

On the other hand, in azimuth No. 2, a prominent light-receiving signal is found with respect to an average brightness of the ambient light, and thus it is determined that an object is present. Also, azimuths Nos. 3 to 5 of FIG. 6 indicates conditions where the brightness level of the ambient light is different. Under these conditions as well, a laser beam emitted from the light emitter 14 is detected with reference to the ambient light.

FIG. 6 simulates that the brightness level of the ambient light is higher in azimuth No. 3 than in azimuth Nos. 1 and 2. In this case as well, an object is determined as being present if a light-receiving signal is received and the signal has a brightness higher than the average brightness of the ambient light. FIG. 6 also simulates that the brightness level of the ambient light is higher in azimuth Nos. 4 and 5 than in azimuth No. 3. In azimuth No. 4, a light-receiving signal has been received, which has a brightness higher than the average brightness of the ambient light. Accordingly, it is determined that an object is present. In azimuth No. 5, however, such a light-receiving signal has not been received and thus it is determined that an object is not present.

The light-receiver 15 may, for example, be a photodiode or a phototransistor, or a photoelectric converting means, such as a photoelectric multiplier, that outputs an electrical physical quantity according to light quantity. Upon reception of the reflected light of a laser beam, the light receiver 15 outputs a voltage for a duration of time equivalent to the duration of emission of the laser beam. In this case, the outputted voltage is obtained by adding a voltage Vp that corresponds to the light quantity of the reflected light to a voltage that corresponds to the ambient brightness.

In the distance calculation process described above, it is recognized that the light receiver 15 has detected the voltage Vp that corresponds to the reflected light of the laser beam. Then, an objective distance is calculated based on the time from when the laser beam has been emitted from the light emitter until when the voltage Vp is detected.

Also, in performing the objective distance calculation process, the detected voltage Vp is handled as being a voltage corresponding to the reflected light of the laser beam, on condition that a voltage difference is detected, which is equal to or more than a predetermined threshold with reference to the voltage corresponding to the ambient light. The voltage corresponding to the ambient light is obtained from an average output from the light receiver 15 in some time range (e.g., when reflected light is not being detected (when an object is determined not to be present)).

In the reflection intensity calculation process, the volume of the detected voltage Vp is calculated if the voltage Vp corresponds to the reflected light of the laser beam. The results of the detection regarding the objective distance and the reflection intensity obtained through the objective distance calculation process and the reflection intensity calculation process are stored in a recognition memory, such as RAM.

When the objective distance/reflection intensity process is ended, it is determined whether or not laser beam scanning be ended (S140). Whether to end scanning is determined based on whether or not the light receiver 15 (light emitter 14) has been oriented in the direction corresponding to the last azimuth number and layer number (e.g. the direction of maximum azimuth number and layer number) in detecting the objective distance or reflection intensity.

If scanning is not ended (NO at S140), the processes from S110 onward are repeated. If scanning is ended (YES at S140), the results of the detection of objective distances and the results of the detection of reflection intensities are acquired from the recognition memory, such as RAM (S150: detection results acquiring means).

Then, based on the acquired results of the detections, a roadside (first edge line) is detected based on the results of the detection of objective distances (S160: first edge line detecting means). In this process, candidates of roadsides (roadside candidates) are detected for each layer for the results of the detection of objective distances in azimuth Nos. 1 to N.

Specifically, the results of the detections of the objective distance between adjacent azimuths are sequentially compared. As a result of the comparison, an azimuth having a difference equal to or more than a reference distance (an azimuth whose time lag of receiving reflected light is equal to or more than a reference time difference) is detected. In this case, such an azimuth is detected one for the left and one for the right with reference to the front position of the vehicle in the crosswise direction. These azimuths are set as roadside candidates. In this case, if two or more azimuths are detected, which have a difference of not less than the reference distance, the one nearest to the front position of the vehicle in the crosswise direction is selected as a roadside candidate. Alternatively, the one nearest to the results of the previous roadside detection may be used as a roadside candidate.

Subsequently, a roadside (second edge line) is detected based on the reflection intensity (S170: second edge line detecting means). In this process, similar to the roadside based on the results of distance measurement, roadside candidates are detected for each layer for the results of the detection of reflection intensities in azimuth Nos. 1 to N. Specifically, the results of the detections of the reflection intensity between adjacent azimuths are sequentially compared. As a result of the comparison, azimuths having a difference equal to or more than a reference reflection intensity difference are detected as roadside candidates.

After performing the processes of S160 and S170, two roadside candidates are obtained for each of the left and right sides of the vehicle for each layer.

Subsequently, the edge-line detection process is performed (S180: roadside setting means). In the edge-line detection process, the way of using the roadsides based on the results of the objective distance detections and the roadsides based on the reflection intensity detections is set to determine the location of a roadside.

Specifically, as shown in FIG. 7, a voting space 1 and a voting space 2 are initialized (S310 and S320). The term "voting space" refers to a virtual space used for calculating an approximate curve (approximate straight line). Subsequently, a variable "i" is reset (S330). Then, the variable "I (a positive integer)" is compared with a constant "M (a positive integer)" (S340). The constant "M" here indicates the number of layers (maximum value of layer number).

If the variable "i" is less than the constant "M" (YES at S340), a voting process is performed for an "$i^{th}$" layer (S350 and S360). The term "voting process" refers to a process of taking constants in the functions that indicate an approximate curve into axes of the voting space mentioned above, and plotting possible combinations of the constants in the voting space to pass through the selected roadside candidates.

FIGS. 8A to 8D are schematic diagrams illustrating a voting process. FIG. 8A specifically illustrates a voting process (S350) based on the results of the detection of objective distance. As shown in FIG. 8A, a roadside candidate has (x, y) coordinates. As shown in FIG. 8B, the functions indicating an approximate curve in an "x-y" plane where the vehicle is located are each assumed to be "x=ay+b" ("a" and "b" are coefficients). In the voting space 1 taking the coefficients "a" and "b" into the axes, possible combinations of "a" and "b" are plotted while the coefficient "b" is changed on a predetermined-value (e.g., 0.1) basis.

Then, in a voting process based on reflection intensity (S360), a process similar to the voting process described above is performed in a voting space (voting space 2) different from the voting space (voting space 1) used for the voting process based on the results of the detection of objective distance. In performing the voting process based on reflection intensity, the same voting space may be used as the one used for the voting process based on the results of the detection of objective distance.

After completing the voting process for the roadside candidates of the selected layer, the variable "i" is incremented (S370) and control returns to S340. In this way, the voting process is performed for each roadside candidate. Accordingly, lots of roadside candidates are plotted in a voting space. Also, those roadside candidates which were detected in the past may be used for the voting process, while the location of the vehicle of the moment is estimated based on the amount of translation and the amount of rotation of the vehicle.

In this way, additional use of the results of the detection in the past contribute to the increase of the number of votes in a voting space, whereby results of high reliability are obtained.

It should be appreciated that the amount of translation and the amount of rotation may be estimated using a known method, based such as on the speed and the steering angle of the vehicle.

If the variable "i" is equal to or more than the constant "M" at S340 (NO at S340), this means that the voting processes for all of the roadside candidates have been completed. Thus, subsequently, an approximate curve is calculated based on the voting processes to perform the edge-line determination process (S380) for specifying a roadside. FIG. 9 is a flow diagram illustrating the edge-line determination process. As shown in FIG. 9, in the voting space 1 where the results of the detection of objective distances have been voted, a maximally voted position is extracted from a voting space region corresponding to the left side with respect to the front position of the vehicle (S410).

The "voting space region corresponding to the left side with respect to the front position of the vehicle" refers to a region where the combination of the coefficients "a" and "b" draws out a coordinate "x" having a negative value. As an approximate method, a voting space region that satisfies a relation "b<0" may be set as the "voting space region corresponding to the left side with respect to the front position of the vehicle".

This is based on a concept that, assuming the road in the vicinity of the vehicle can be approximated by a straight line substantially parallel to the traveling direction of the vehicle, and if an intercept "b" of the approximate straight line is negative, the intercept will indicate a roadside on the left side with respect to the front position of the vehicle. For example, if the fact that the road has a curved shape is recognized in advance, the "voting space region corresponding to the left side with respect to the front position of the vehicle" indicates a region in which the combination of the coefficients "a" and "b" corresponds to a position where a left-side roadside is estimated to reside.

The term "maximally voted position" refers to a point (region) in a voting space, where the degree of concentration of the plots for the roadside candidates is relatively high. Here, one maximally voted position is extracted from the region ("voting space region corresponding to the left side with respect to the front position of the vehicle") mentioned above. The maximally voted positions extracted here indicates the coefficient "a" and the coefficient "b" of the straight line "x=ay+b" in the "x-y" plane shown in FIG. 8A, which straight line expresses an edge line having irregularity, such as a wall surface or a guard rail.

In order to detect the maximally voted positions, the voting space may be divided into matrix blocks on a predetermined-value basis, for example, and the number of plots may be counted in each of the blocks.

To this end, the number of plots may be counted for each of the blocks after completion of all the plotting, or a counter value in a region plotted in the voting process may be incremented every time a plot is given. It should be appreciated that the number of votes (the number of plots) at the maximally voted positions is stored in a predetermined region in the RAM.

Subsequently, one maximally voted position is extracted from the voting space region corresponding to the left side with respect to the front position of the vehicle, in the voting space 2 where reflection intensities have been voted (S420). The maximally voted position extracted here indicates the coefficient "a" and the coefficient "b" of the straight line "x=ay+b" in the "x-y" plane shown in FIG. 8C, which straight line expresses the edge line having no irregularity, such as a white line. It should be appreciated that a process similar to the one in the method described is used in a method of setting a voting space region corresponding to the left side with respect to the front position of the vehicle and in a method of detecting a maximally voted position.

Subsequently, it is determined whether or not the extracted two maximally voted positions satisfy predetermined conditions (S430). The "predetermined conditions" may only have to be those conditions under which the maximally voted positions are determined as having a high reliability. For example, the maximally voted positions may satisfy all of the following conditions:

[1] The number of votes in each of the maximally voted positions is equal to or more than a threshold (confirmation of reliability)
[2] The straight lines obtained from the two maximally voted positions are substantially parallel to each other (difference between inclinations "a" is within a threshold range)
[3] The straight lines obtained from the two maximally voted positions reside in different positions (difference between intercepts "b" is equal to or more than a threshold)

In defining the coefficients "a" and "b" in each of the straight lines obtained from the maximally voted positions, averages of the values of the coefficients "a" and "b" may be used, which have been plotted in the maximally voted position. Alternatively, the matrix blocks in the voting space may be correlated in advance to respective values (representative values) to indicate the respective matrix blocks and representative values in the maximally voted position may be used.

If the extracted two maximally voted positions satisfy the predetermined conditions (YES at S430), of the two straight lines, the one far from the vehicle is set as a physical edge line (S440) and the other one near the vehicle is set as a legal edge line (S450). The term "physical edge line" here refers to an edge line (defining curb, wall surface, cliff, or the like) which, if it is crossed over, may lead to collision or running off. The term "legal edge line" refers to an edge line (defining white line, yellow line, or the like) which, if it is crossed over, may not immediately lead to collision or running off but may lead to traveling out of the region which is legally accepted as a road.

On the other hand, if the two maximally voted positions do not satisfy the predetermined conditions (NO at S430), the straight line corresponding to the maximally voted position having more number of votes is set as the physical edge line (S460) and the legal edge line is nullified (S470). The reason why the maximally voted position having the greater number of votes is used for the physical edge line is that the maximally voted position having the greater number of votes has higher reliability than another maximally voted position having less number of votes. For example, while a white line has been detected as indicating the legal edge line, if the paint conditions of the white line are bad (e.g., the white line is worn out), the number of votes at the maximally voted position will be decreased.

In such a case, the white line could be a white line which used to indicate a roadside but remained as it is after performing roadworks for changing the structure of the road. Thus, in this case, the physical edge line having higher reliability (i.e. having more number of votes) may be used as a roadside. Alternatively, if avoiding running off is the first goal, the straight line nearer the vehicle may be set as the physical edge line, irrespective of the number votes.

Then, at S510 to S570, processes similar to those of S410 to S470 are performed in the voting space region corresponding to the right side of the vehicle. After completing such an edge-line determination process, the edge-line detection process is ended and accordingly the radar processing is ended.

Figures 10A, 10B, 10C:
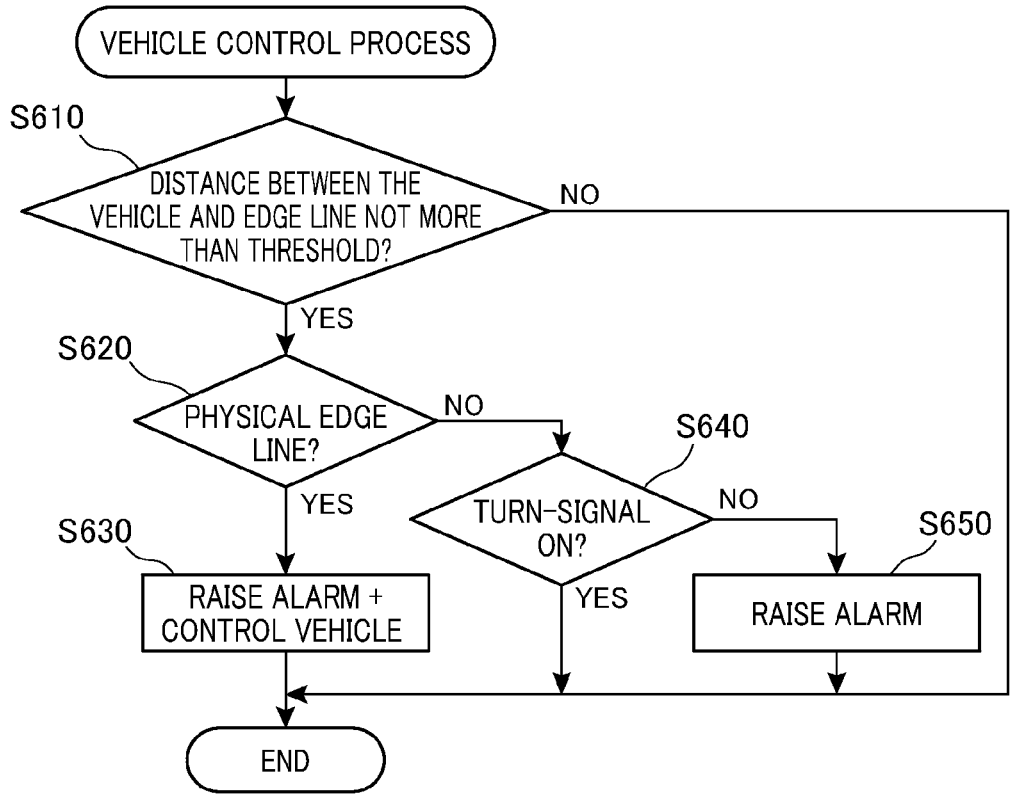
FIG. 10A is a flow diagram illustrating a vehicle control process performed in the system.
FIGS. 10B and 10C are schematic bird's eye views illustrating the vehicle control process.

Referring to FIGS. 10A to 10C, hereinafter is described a process for giving an alarm to the driver, using a roadside detected through the radar processing. FIG. 10A is a flow diagram illustrating a vehicle control process (drive assisting means) which is performed by the vehicle control unit 30. FIGS. 10B and 10C are schematic bird's eye views illustrating the vehicle control process.

The vehicle control process is repeatedly performed at a predetermined cycle (e.g., every 100 ms) while the vehicle is traveling. As shown in FIG. 10A, first, the distance between the vehicle and an edge line (physical edge line or legal edge line) is compared with a predetermined threshold (e.g., 50 cm) (S610).

If the distance between the vehicle and the edge line is larger than the threshold (NO at S610), the vehicle control process is ended. If the distance between the vehicle and the edge line is equal to or less than the threshold (YES at S610), it is determined whether or not the edge line is a physical edge line (S620).

If the edge line is a physical edge line (YES at S620), the vehicle is likely to collide such as with curb, wall surface or cliff crossing over the physical edge line (or runs off the physical edge line), for example, and thus an alarm is raised and at the same time the vehicle control process is performed (S630). For example, in this process, warning is given to the driver using images or sound, while vehicle control is performed such as by decelerating the vehicle or steering the wheel to a direction opposite to the physical edge line.

If the edge line is a legal edge line (NO at S620), it is determined whether or not a turn-signal light is turned on (S640). If a turn-signal light is on (YES at S640), it is determined that the deviation from the road has been intentionally caused by the driver. Accordingly, the vehicle control process is ended without giving an alarm or the like.

If a turn-signal light is not on (NO at S640), it is estimated that the deviation from the road is not the driver's intention but at the same time it is estimated that, as shown in FIG. 10C, the vehicle would not cause collision. Accordingly, an alarm is merely given (S650). After giving an alarm or the like in this way, the vehicle control process is ended.

In the drive assist system 1 specifically described above, the radar control unit 11 of the radar system 10 detects a roadside of the road on which the vehicle travels by performing the radar processing. Meanwhile, the vehicle control unit 30 performs the vehicle control process to assist driving so that, when the vehicle has neared a roadside, the vehicle would not near the roadside any more.

To specifically explain the radar system 10, a region to be detected is divided into a number of separate regions (matrix blocks) so as to be juxtaposed in the crosswise direction perpendicular to the forward direction of the vehicle. In the region to be detected, the radar control unit 11 emits a light wave to each of the separate regions. The light wave is reflected by an object to be measured and the reflected light is received by the radar control unit 11. Then, the radar control unit 11 detects a reflection intensity of the reflected light and a distance to the object to be measured (objective distance) and records the results on a memory, such as RAM. Then, the recorded reflection intensity and objective distance are acquired on a separate-region basis.

The radar control unit 11 detects the first edge line in which the difference between the objective distances of adjacent separate regions among the individual separate regions becomes equal to or more than a reference distance difference. Also, the radar control unit 11 detects the second edge line in which the difference between the reflection intensities of adjacent separate regions among the individual separate regions becomes equal to or more than a reference intensity difference. Then, the radar control unit 11 specifies the position of each edge line based on the objective distance corresponding to the edge line, followed by setting the first or second edge line as a roadside.

According to the radar system 10, drive assist is given so that the vehicle would not deviate from the road, based on the results of the roadside detection. The radar system 10 uses both of objective distance and reflection intensity to detect an edge line on which the difference between objective distances and the difference between reflection intensities become equal to or more than respective reference values. Accordingly, a roadside can be detected if only either one of the edge lines has been detected. Thus, the accuracy of detecting a roadside is enhanced.

Figure 2:
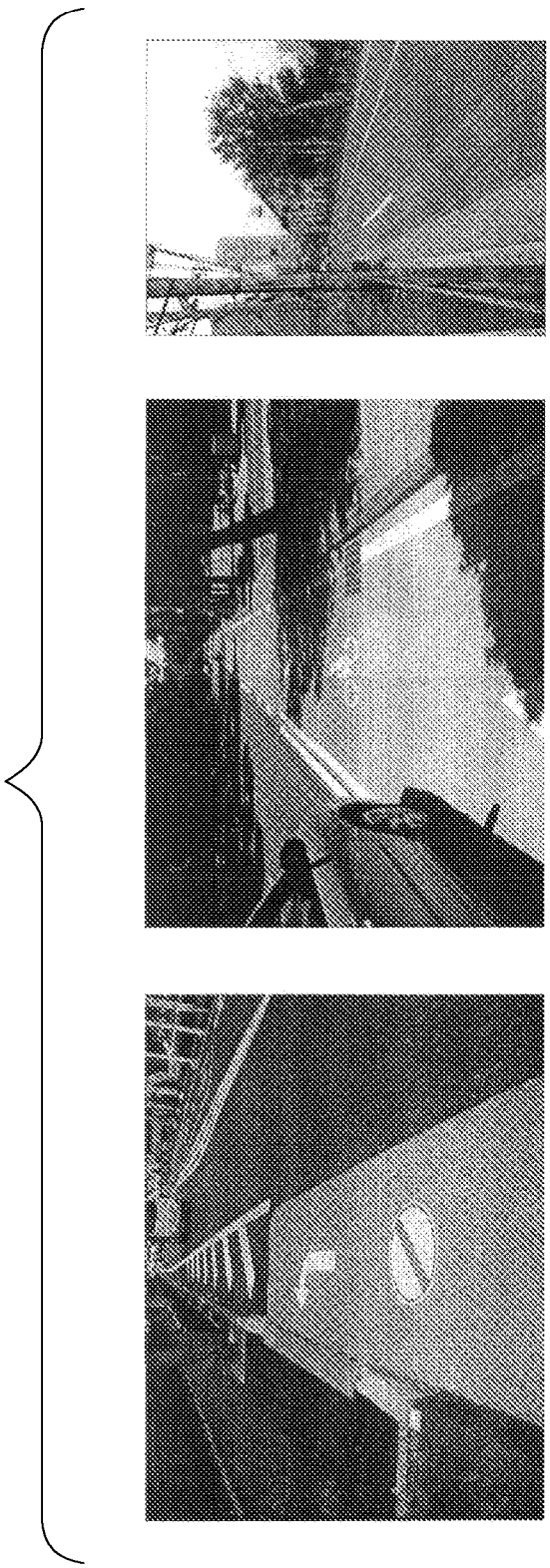
FIG. 2 shows photographs indicating roadsides which are difficult to be detected using conventional art.

The radar control unit 11 is able to detect irregularity on the surface of a road based on the difference between objective distances. Also, the radar control unit 11 is able to detect an edge line in a road, where the material (reflectance) of the road changes, based on the difference between reflection intensities of the reflected light. In his way, use of the difference not only between objective distances but also between reflection intensities enables detection of road edge lines defining, for example, a white line or a road mark painted on a road surface to indicate a lane dedicated to two wheels (FIGS. 2A and 2B), which detection has been difficult for the conventional art.

Further, in the radar system 10, the radar control unit 11 acquires a plurality of sets of objective distance and reflection intensity detected in the respective plurality of separate regions to be detected. Then, using the objective distances and the reflection intensities detected in the plurality of separate regions to be detected, the first and second edge lines are detected.

According to the radar system 10, a roadside is detected using a plurality of sets of objective distance and reflection intensity detected in the respective plurality of separate regions to be detected. Thus, comparing with the case where a single set of objective distance and reflection intensity is used, an adverse effect such as of noise is unlikely to be received. For example, as shown in FIG. 11, since the wall surface on the left side of the vehicle with respect to its traveling direction has large irregularity comparing with the road surface, the irregularity can be detected even with the conventional art.

On the other hand, on the right side of the vehicle with respect to its traveling direction, the irregularity is small such as in sand, stones or trees. Accordingly, in such sand, stones or trees, the change of objective distance is not sufficiently large comparing with that in the road surface, and thus detection of the roadside may be disabled. In this regard, the present invention enables detection of not only the physical edge line having irregularity but also the legal edge line having no irregularity, and thus the white line as illustrated in FIG. 11 can also be detected. In this way, the accuracy of detecting a roadside is enhanced.

Further, in the radar system 10, the radar control unit 11 detects roadsides on both of left and right sides of the vehicle with reference to the front position of the vehicle in the crosswise direction.

Further, the radar system 10 not only detects one of the left and right roadsides but also detects both of the left and right roadsides.

Furthermore, in the radar system 10, the radar control unit 11 may set either the first edge line or the second edge line as a roadside, whichever is nearer to the front position of the vehicle.

According to the radar system 10, a roadside can be set at a position nearer to the front position of the vehicle. Accordingly, if a roadside is erroneously detected, it is ensured that the erroneous detection will not cause running off, or the like, of the vehicle.

In the drive assist system 1, the vehicle control unit 30 gives a different drive assist in the vehicle control process, depending on the case where the vehicle has neared the physical edge line and the case where the vehicle has neared the legal edge line.

When both of the physical and legal edge lines are detected, the drive assist system 1 is able to give a different drive assist, depending on which of the edge lines the vehicle nears. Also, when the vehicle has neared the legal edge line, there is a low probability of immediately causing collision, falling down or running off the road. Accordingly, an alarm may be raised and the vehicle control may be performed.

Further, for example, when the vehicle has neared the physical edge line, there is a probability of causing collision, falling down or running off the road. Accordingly, a warning is given such as via images or sound to the driver, while vehicle control is performed such as by decelerating the vehicle or steering the wheel to a direction opposite to the physical edge line.

Thus, when the vehicle has neared the legal edge line and then has neared the physical edge line, the drive assist system 1 of the above embodiment is able to give warning and/or perform vehicle control in two stages. In this way, it is ensured that the driver is assisted so as to be situated on a safer side.

Furthermore, owing to the detection of both of the lawful and physical edge lines, the drive assist system 1 can select giving a caution (low-degree warning) or raising an alarm (high-degree warning).

(Modifications)

The embodiment of the present invention is not limited to the embodiment described above but may be variously modified as far as the modifications fall within the technical range of the present invention.

In the above embodiment, roadside candidates have been detected for each of a plurality of layers. Then, a voting process has been conducted regarding the plurality of detected roadside candidates to determine the position of a roadside. Alternatively, in this case, the voting process may be conducted taking into account the positions of the roadside candidates detected in the processing in the past. Specifically, the degree of relative movement of the positions of the roadside candidates detected in the past may be estimated by detecting the behaviors of the vehicle (vehicle speed and angular speed). Then, in the voting process (S340 and S350), votes may additionally be cast for roadside candidates on the assumption that they have been detected at the estimated positions.

In the above embodiment, if the two extracted maximally voted positions satisfy the predetermined conditions (YES at S420), of the two straight lines, the one far from the vehicle has been set as the physical edge line (S430) and the other one nearer to the vehicle has been set as the legal edge line (S440). Alternatively, however, the roadside based on the results of the objective distance detection may be set as the physical edge line, while the roadside based on reflection intensity may be set as the legal edge line. In other words, an edge line may be set as the physical edge line if a three-dimensional object, such as a wall surface or a cliff, is estimated to be present, and an edge line may be set as the legal edge line if no three-dimensional object is estimated to be present.

In order to realize such a process, a voting space for detecting a roadside based on the results of objective distance detection may be provided separately from a voting space for detecting a roadside based on reflection intensity. In such a configuration as well, the effects similar to those of the above embodiment may be enjoyed.

In the above embodiment, maximally voted positions have been extracted from a voting space to set the physical edge line and the legal edge line. Alternatively, if the number of votes is small at the maximally voted positions, the reliability of the results of the detection may be determined to be low. Thus, the results of the determination that the reliability is low may be outputted such as to a display unit or a speech-output unit, not shown. By carrying out such a process, drive assist may be prevented from being adversely affected by erroneous detection of a roadside.

In the embodiment described above, an approximate curve in the voting process has been assumed to be "x=ay+b" based on the concept that the road in the vicinity of the vehicle can be approximated to a straight line. Alternatively, the road in the vicinity of the vehicle may be set as a quadratic curve of "x=ay^2+by+c" that can express not only a straight line but also a curve. In this way, the position of a roadside is more correctly calculated than in the use of a linear curve.

Further, if the road in the forward direction of the vehicle can be grasped as being a straight line or a curve from vehicle information, such as a steering angle, or from map information, the approximate curve may be switched depending on the situation. Such map information, when it is used, may be ensured to be acquired such as from a known navigation system.

The present invention may be embodied in other specific forms without departing from the spirit or essential characteristics thereof. The present embodiments are therefore to be considered in all respects as illustrative and not restrictive, the scope of the present invention being indicated by the appended claims rather than by the foregoing description and all changes which come within the meaning and range of equivalency of the claims are therefore intended to be embraced therein.

What is claimed is:

1. A roadside detection system installed in a vehicle to detect a roadside of a road on which the vehicle travels, the system comprising:
    acquiring means that emits light waves or electromagnetic waves to a target detection region in which an object to be measured is detected and acquires, as an objective distance, a distance to the object to be measured from a reflected wave reflected from the object to be measured and, as a reflection intensity, an intensity of the reflected wave, for each of separate regions obtained by separating the target detection region into a plurality of divisions;
    first edge line detecting means that detects a first edge line that is a candidate of the roadside based on each objective distance, the first edge line being a physical edge line that indicates that the vehicle will run off the road or cause a collision when the vehicle crosses over the physical edge line; and
    second edge line detecting means that detects a second edge line that is a candidate of the roadside based on each reflection intensity, the second edge indicating a legal edge line drawn between the road and a region which is outside the road.

2. The roadside detection system according to claim 1, wherein:
    the first edge line detecting means detects a portion defined by the first edge line, in which a difference between the objective distances of adjacent separate regions among the individual separate regions becomes equal to or more than a reference distance difference; and
    the second edge line detecting means detects a portion defined by the second edge line, in which a difference between the reflection intensities of adjacent separate regions among the individual separate regions becomes equal to or more than a reference intensity difference.

3. The roadside detection system according to claim 2, wherein the acquiring means acquires objective distance and reflection intensity of each separate region detected by optical detecting means that emits a light wave to each of the separate regions to receive reflected light that is a reflection of the light wave from an object to be measured, in a target detection region formed by virtually juxtaposing a number of separate regions in a crosswise direction perpendicular to a traveling direction of the vehicle, each of the separate regions serving as a target in which an object to be measured is detected.

4. The roadside detection system according to claim 3, wherein the system is provided with the optical detecting means.

5. The roadside detection system according to claim 4, wherein:
    the acquiring means acquires a plurality of sets of objective distance and reflection intensity detected in the plurality of respective separate regions; and
    the first and second edge line detecting means detect the first and second edge lines using the plurality of objective distances and reflection intensities detected in the plurality of respective separate regions, respectively.

6. The roadside detection system according to claim 5, comprising roadside setting means that sets, as the roadside, either the first edge line or the second edge line.

7. The roadside detection system according to claim 6, wherein the roadside setting means also detects the roadside on the left and on the right with reference to a front position of the vehicle in a crosswise direction of the vehicle.

8. The roadside detection system according to claim 7, wherein the roadside setting means sets, as the roadside, either of the edge lines detected by the edge line detecting means, whichever is nearer to the front position of the vehicle.

9. The roadside detection system according to claim 1, wherein the acquiring means acquires objective distance and reflection intensity of each separate region detected by optical detecting means that emits a light wave to each of the separate regions to receive reflected light that is a reflection of the light wave from an object to be measured, in a target detection region formed by virtually juxtaposing a number of separate regions in a crosswise direction perpendicular to a traveling direction of the vehicle, each of the separate regions serving as a target in which an object to be measured is detected.

10. The roadside detection system according to claim 1, wherein the system is provided with the optical detecting means.

11. The roadside detection system according to claim 1, wherein:
    the acquiring means acquires a plurality of sets of objective distance and reflection intensity detected in the plurality of respective separate regions; and
    the first and second edge line detecting means detect the first and second edge lines using the plurality of objective distances and reflection intensities detected in the plurality of separate regions, respectively.

12. The roadside detection system according to claim 1, comprising roadside setting means that sets, as the roadside, either the first edge line or the second edge line.

13. The roadside detection system according to claim 12, wherein the roadside setting means detects the roadside on the left and on the right with reference to a front position of the vehicle in a crosswise direction of the vehicle.

14. The roadside detection system according to claim 13, wherein the roadside setting means sets, as the roadside, either of the edge lines detected by the edge line detecting means, whichever is nearer to the front position of the vehicle.

15. A driver assistance system installed in a vehicle to assist driving operation of a driver of the vehicle, the system comprising:
    roadside detecting means that detects a roadside of a road on which the vehicle travels;
    drive assisting means that gives drive assist so that the vehicle no longer comes close to the roadside when the vehicle nears the roadside,
    wherein:
    the roadside setting means is provided as a roadside detection system;
    the drive assisting means gives the drive assist differently in a state where the vehicle comes closer to the physical edge line and in a state where the vehicle comes closer to the legal edge line; and
    the roadside detection system comprises:
    acquiring means that emits light waves or electromagnetic waves to a target detection region in which an object to be measured is detected and acquires, as an objective distance, a distance to the object to be measured from a reflected wave reflected from the object to be measured and, as a reflection intensity, an intensity of the reflected wave, for each of separate regions obtained by separating the target detection region into a plurality of divisions;
    first edge line detecting means that detects a first edge line that is a candidate of the roadside based on each objective distance, the first edge line being a physical edge line which shows the roadside; and
    second edge line detecting means that detects a second edge line that is a candidate of the roadside based on each reflection intensity, the second edge indicating a legal edge line which shows an edge line dividing the road and an area outside the road.

16. The drive assistance system according to claim 15, wherein the drive assistance means gives the drive assist which is either issuing an alarm to a driver of the vehicle or braking the vehicle.

17. A driver assistance system installed in a vehicle to assist driving operation of a driver of the vehicle, the system comprising:
    roadside detecting means that detects a roadside of a road on which the vehicle travels;
    drive assisting means that gives drive assist so that the vehicle no longer comes close to the roadside when the vehicle nears the roadside, wherein:
    the roadside detecting means comprises:
    acquiring means that emits light waves or electromagnetic waves to a target detection region in which an object to be measured is detected and acquires, as an objective distance, a distance to the object to be measured from a reflected wave reflected from the object to be measured and, as a reflection intensity, an intensity of the reflected wave, for each of separate regions obtained by separating the target detection region into a plurality of divisions;
    first edge line detecting means that detects a first edge line that is a candidate of the roadside based on each objective distance, the first edge line being a physical edge line which shows the roadside; and
    second edge line detecting means that detects a second edge line that is a candidate of the roadside based on each reflection intensity, the second edge indicating a legal edge line which shows an edge line dividing the road and an area outside the road.

18. The drive assistance system according to claim 17, wherein:
    the drive assisting means gives drive assist differently when in a state where the vehicle nears the physical edge line and when in a state where the vehicle nears the legal edge line.

19. A roadside detecting method for detecting a roadside of a road on which the vehicle travels, the method comprising steps of:
    emitting light waves or electromagnetic waves to a target detection region in which an object to be measured is detected;
    acquiring, as an objective distance, a distance to the object to be measured from a reflected wave reflected from the object to be measured and, as a reflection intensity, an intensity of the reflected wave, for each of separate regions obtained by separating the target detection region into a plurality of divisions;
    first detecting a first edge line that is a candidate of the roadside based on each objective distance, the first edge line being a physical edge line which shows the roadside; and
    second detecting a second edge line that is a candidate of the roadside based on each reflection intensity, the second edge indicating a legal edge line which shows an edge line dividing the road and an area outside the road.

* * * * *